US012452227B2

(12) United States Patent
Squire et al.

(10) Patent No.: US 12,452,227 B2
(45) Date of Patent: *Oct. 21, 2025

(54) METHODS AND SYSTEMS FOR ACCESSING A RESOURCE

(71) Applicant: Comcast Cable Communications, LLC, Philadelphia, PA (US)

(72) Inventors: Jonathan Squire, Manasquan, NJ (US); James Hoelsworth, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/140,399

(22) Filed: Apr. 27, 2023

(65) Prior Publication Data

US 2023/0344816 A1 Oct. 26, 2023

Related U.S. Application Data

(63) Continuation of application No. 17/743,171, filed on May 12, 2022, now Pat. No. 11,671,418, which is a continuation of application No. 16/833,060, filed on Mar. 27, 2020, now Pat. No. 11,363,007.

(51) Int. Cl.
*H04W 4/12* (2009.01)
*G06F 21/62* (2013.01)
*H04L 9/40* (2022.01)

(52) U.S. Cl.
CPC ...... *H04L 63/0807* (2013.01); *G06F 21/6245* (2013.01); *H04L 63/0407* (2013.01); *H04W 4/12* (2013.01)

(58) Field of Classification Search
CPC .. H04L 63/0807; H04L 63/0407; H04W 4/12; G06F 21/6245
See application file for complete search history.

(56) References Cited

U.S. PATENT DOCUMENTS

| | | | |
|---|---|---|---|
| 10,715,514 B1* | 7/2020 | Threlkeld | H04L 63/0807 |
| 10,720,001 B1* | 7/2020 | Grosberg | G07C 9/27 |
| 2017/0223005 A1* | 8/2017 | Birgisson | H04L 63/083 |
| 2018/0137512 A1* | 5/2018 | Georgiadis | H04L 63/08 |
| 2018/0234426 A1* | 8/2018 | Huang | H04L 9/0643 |
| 2018/0330368 A1* | 11/2018 | Slupesky | H04L 67/02 |

(Continued)

OTHER PUBLICATIONS

"Refreshed (New) access tokens throws 124; invalid access token; original AT works fine," Zoom Developer Forum, Mar. 26, 2020.

*Primary Examiner* — Frantz B Jean
(74) *Attorney, Agent, or Firm* — Ballard Spahr LLP

(57) ABSTRACT

A client application requesting to access a resource may be issued an access token and a refresh token. Instead of revoking the client application access to a resource by revoking the refresh token, allowing the access token to expire, and forcing a user associated with the client application to re-login, authentication for the client application to access the resource may be obtained from the user. The authentication may be obtained from the user while the client application, without notification of the concurrent authentication, may continue attempts to access the resource, for example, via an invalid access token. Once authentication is obtained, the client application may be provided access to the resource, for example, via a valid access token.

60 Claims, 8 Drawing Sheets

(56) References Cited

U.S. PATENT DOCUMENTS

2019/0372957 A1* 12/2019 Dunjic ................. G06Q 20/322
2021/0099450 A1*  4/2021 Jain .................... H04L 63/0823
2021/0126789 A1*  4/2021 Chang .................. H04L 9/3228

* cited by examiner

METHODS AND SYSTEMS FOR ACCESSING A RESOURCE

CROSS REFERENCE TO RELATED PATENT APPLICATIONS

This application claims priority under 35 U.S.C. § 120 to, and is a continuation of, U.S. Patent Application No. 17/743,171, filed on May 12, 2022, now U.S. Pat. No. 11,671,418, which is a continuation of U.S. patent application Ser. No. 16/833,060, filed on Mar. 27, 2020, now U.S. Pat. No. 11,363,007, the entire contents of which are hereby incorporated herein by reference for all purposes.

BACKGROUND

Authorization protocols operate by using credentials to authenticate a client (e.g., webpage, browser, online interface, desktop application, mobile application, etc.) requesting access to a resource. During a communication session, an authenticated client is typically issued an access token that authorizes the client to access the resource and (optionally) a refresh token. If the behavior of the client accessing the resource seem suspicious and/or malicious, the ability of the client to access the resource is revoked by revoking the refresh token and allowing the access token to expire. When the refresh token is revoked and the access token is expired, the communication session will terminate, and the resource owner must again provide credentials to authenticate the client (e.g., re-login in, etc.). Each time credentials are used to authenticate the client, the credentials may be exposed to one or more security issues, such as phishing attacks. When a refresh token is revoked due to client behavior that seems suspicious and/or malicious, but is in fact credible, then a user is inconvenienced by having to repeat the login process that may unnecessarily expose credentials to one or more security issues.

SUMMARY

It is to be understood that both the following general description and the following detailed description are exemplary and explanatory only and are not restrictive. Methods and systems for accessing a resource are described.

During a communication session between a client (e.g., client application, webpage, browser, online interface, desktop application, mobile application, etc.) and a resource device (e.g., a server, etc.) the client may use an access token to access a resource. If the access token expires, is revoked, and/or is otherwise invalid, the client may be denied access to the resource. In an attempt to reestablish access to the resource, the client may send a refresh token to an authorization server (e.g., an OAUTH authorization server, an AuthZ server, etc.) to obtain a new access token.

To ensure that the client is trustworthy and/or to improve security of the communication session (when the client is accessing and/or attempting to access the resource), when the client sends the refresh token to the authorization server to obtain a new access token, the authorization server may cause a push notification to be sent to resource owner to verify their identity. Concurrent to the identity of the resource owner being verified, the authorization server may send an invalid access token to the client. The client is unaware that the invalid access token is invalid, and presents the access token to the resource in attempt to access the resource. The client will be notified that the access token is invalid, and based on the notification, request a new access token as long as the refresh token is valid. The process of the client attempting to access the resource using an invalid access token may be repeated until either the refresh token expires (or is revoked/invalidated) or the authorization server receives a positive confirmation that the identity of the resource owner has been verified (e.g., credential verified, etc.). When the authorization server receives a positive confirmation that the identity of the resource owner has been verified, the client may be issued a valid access token to access the resource.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

Figure 1:
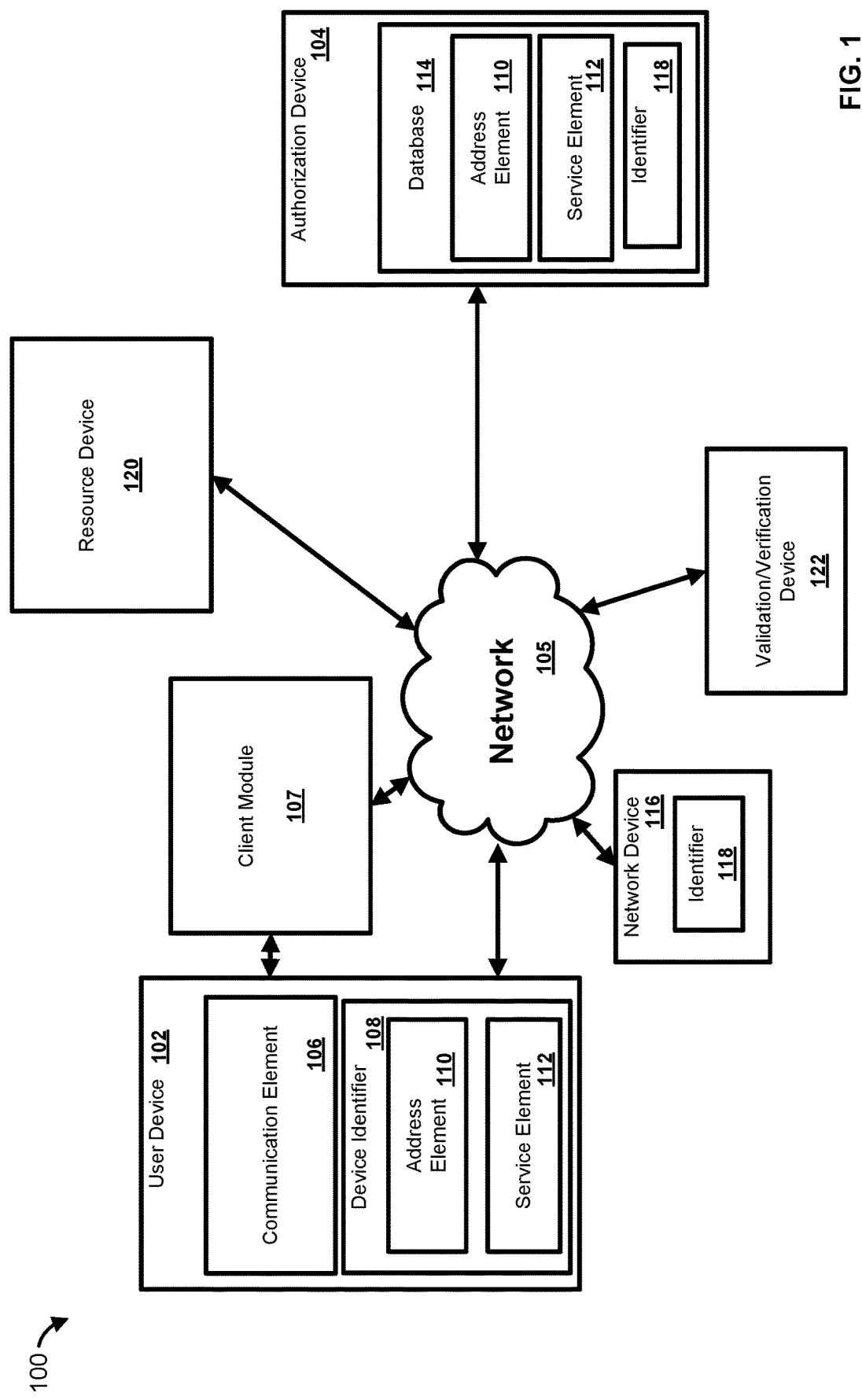
FIG. 1 shows a system for accessing a resource.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

A client (e.g., a client application, webpage, browser, online interface, desktop application, mobile application, etc.) may request access (e.g., application programming interface (API) access, etc.) to a resource managed by and/or hosted by a resource provider (e.g., a resource device, etc.). For example, an online shopping webpage (client application) may request a photo and or a contact list (resources) from a user's (resource owner) Facebook® page. During a communication session, credentials (e.g., username, password, login information, biometric information (e.g., fingerprint, facial recognition data, voice print, etc.), a device identifier, a hardware authenticator (such as FIDO2), etc.) of the resource owner and/or a device associated with the resource owner may be used to authenticate the client. For example, the online shopping webpage may generate an interface that requests the user's Facebook login information.

An authenticated client may be issued an access token that authorizes the client to access the resource and a refresh token. The access token may be a user access token, an app access token, a page access token, or any other type of access token. The access token may have a specified duration/longevity after which it expires, and the refresh token may have an extended duration/longevity relative to the access token. When the access token expires (or is otherwise invalid), the client may use the refresh token to request a new access token.

To ensure that the client is trustworthy and/or to improve security of the communication session (when the client is accessing and/or attempting to access the resource), when the client attempts to use the refresh token to obtain a new access token, a push notification may be sent to resource owner to verify their identity. Concurrent to identity of the resource owner being verified, an invalid access token may be sent to the client. The client is unaware that the invalid access token is invalid, and presents the access token to the resource device in attempt to access the resource. For example, the client is unable to determine that the access token is an invalid access token, for example, the invalid access token status may be indeterminable, based on encryption/encoding, protected, and/or the like. The client may notified that the access token is invalid, and based on the notification, request a new access token as long as the refresh token is valid. Based on a positive verification of the identity of the resource owner, the client is issued a new valid access token to access the resource.

FIG. 1 shows a system 100 for accessing a resource. One skilled in the art will appreciate that provided herein is a functional description and that the respective functions may be performed by software, hardware, or a combination of software and hardware.

The system 100 may comprise a network 105. The network 105 may comprise a packet switched network (e.g., internet protocol based network), a non-packet switched network (e.g., quadrature amplitude modulation based network), and/or the like. The network 105 may comprise network adapters, switches, routers, modems, and the like connected through wireless links (e.g., radio frequency, satellite) and/or physical links (e.g., fiber optic cable, coaxial cable, Ethernet cable, or a combination thereof). The network 105 may comprise public networks, private networks, wide area networks (e.g., Internet), local area networks, and/or the like. The network 105 may comprise a content access network, content distribution network, and/or the like. The network 105 may be configured to provide communication from telephone, cellular, modem, and/or other electronic devices to and throughout the system 100. The network 105 and/or devices in communication and/or associated with the network 105 may provide, facilitate, and/or support one or more services, applications, and/or protocols, such as OAuth service or any other authentication/authorization protocol. The network 105 may be configured to be in communication with one or more of a user 102, an authorization device 104, a resource device 120, a verification device 122, and/or any other device/component. In some instances, the network 105 may be configured to be in communication with one or more of the user 102, the authorization device 104, the resource device 120, the verification device 122, and/or any other device/component via a network device 116. The network 105 may include multiple network devices (not shown), such as the network device 116.

The network device 116 may be configured as a wireless access point (WAP). The network device 116 may be configured to allow one or more wireless devices to connect to a wired and/or wireless network using Wi-Fi, Bluetooth or any desired method or standard. The network device 116 may be configured as a local area network (LAN). The network device 116 may comprise a dual band wireless access point. The network device 116 may be configured with a first service set identifier (SSID) (e.g., associated with a user network or private network) to function as a local network for a particular user or users. The network device 116 may be configured with a second service set identifier (SSID) (e.g., associated with a public/community network or a hidden network) to function as a secondary network or redundant network for connected communication devices.

The network device 116 may comprise an identifier 118. The identifier 118 may be or relate to an Internet Protocol (IP) Address IPV4/IPV6 or a media access control address (MAC address) or the like. The identifier 118 may be a unique identifier for facilitating communications on the physical network segment. Each of the network device (e.g., the network device 116) may comprise a distinct identifier 118. The identifier 118 may be associated with a physical location of the network device 116.

The user device 102 may be an electronic device such as a computer, a mobile device, a smart device, a laptop, a tablet, a set top box, a display device, or other device capable of communicating with the network 105 and/or device/components in communication with the network 105. In some cases, the user device 102 may be a client device/interface that requests access or use of resources stored by, hosted by, and/or otherwise associated with the resource device 120.

The user device 102 may be associated with a user identifier or device identifier 108. The device identifier 108 may be any identifier, token, character, string, or the like, for differentiating one user or user device (e.g., user device 102) from another user or user device. The device identifier 108 may identify a user or user device as belonging to a particular class of users or user devices. The device identifier 108 may comprise information relating to the user device such as a manufacturer, a model or type of device, a service provider associated with the user device 102, a state of the user device 102, a locator, and/or a label or classifier. Other information may be represented by the device identifier 108.

The device identifier 108 may comprise an address element 110 and a service element 112. The address element 110 may comprise or provide an internet protocol address, a network address, a media access control (MAC) address, an Internet address, or the like. The address element 110 may be relied upon to establish a communication session between the user device 102 and the computing device 104 or other devices and/or networks. The address element 110 may be used as an identifier or locator of the user device 102. The address element 110 may be persistent for a particular network.

The service element 112 may comprise an identification of a service provider associated with the user device 102 and/or with the class of user device 102. The class of the user device 102 may be related to a type of device, capability of device, type of service being provided, and/or a level of service (e.g., business class, service tier, service package, etc.). The service element 112 may comprise information relating to or provided by a communication service provider (e.g., Internet service provider) that is providing or enabling data flow such as communication services to the user device 102. The service element 112 may comprise information relating to a preferred service provider for one or more particular services relating to the user device 102. The address element 110 may be used to identify or retrieve data from the service element 112, or vice versa. The one or more of the address element 110 and the service element 112 may be stored remotely from the user device 102 and retrieved by one or more devices such as the user device 102 and the computing device 104. Other information may be represented by the service element 112.

The user device 102 may comprise and/or be associated with a communication element 106 for providing an interface to a user to interact with the user device 102, the authorization device 104, the resource device 120, the validation/verification device 122, and/or any other device/component via a network device 116. The communication element 106 may include and/or be associated with software, hardware, and/or interfaces that may be used to provide communication between a user and one or more of the user device 102 and the computing device 104. The communication element 106 may request or query various files from a local source and/or a remote source. The communication element 106 may transmit data to a local or remote device such as the authorization device 104, the resource device 120, the validation/verification device 122, and/or any other device/component.

The resource device 120 may host, store, manage, and/or be associated with one or more resources (e.g., protected resources, data/information, etc.) owned and/or associated a resource owner. The resource device 120 may be configured to accept and respond to requests to access protected resources. The resource device 120 may store indications rights/privileges (e.g., scopes, etc.) for accessing a resource that are recognized by the resource device 120. Rights/privileges (e.g., scopes, etc.) associated with a resource may be indicative of a different set of operations that can be performed relative to a different set of resources hosted, stored, and/or managed by the resource device 120. For example, the resource device 120 may determine the set of operations and the set of resources that are mapped to access information presented to the resource device 120, such as access token presented to the resource device 120 by client module 107. In some instances, the resource device 120 may limit the operations performed by the client module 107 relative to resources maintained by the resource device 120 to those operations specifically indicated by the set of operations mapped to the access information.

The user device 102 may be in communication with and/or associated with a client module 107. The user device 102 (a user of the user device 102) may be in communication with and/or associated with a client module 107 via the communication element 106. The client module 107 may be any interface/application for presenting and/or receiving information to/from the user. The client module 107 may be an application, such as a web application, a user-agent based application (e.g., a single-page (browser-based) application), a native application, application, a mobile application, and or the like that is implemented/run on and/or associated with the user device 102. The client module 107 may be any application, interface, and/or the like that sends requests to access protected resources on behalf of a resource owner (e.g. the user device 102, a user of the user device 102, etc.). In some instances, the client module may be a device (e.g., computing device, server, network device, etc.) in communication with the user device 102. The client module 107 may send requests to access protected resources on behalf of a resource owner (e.g. the user device 102, a user of the user device 102, etc.) along with information that indicates that the client module is authorized to send requests to access protected resources on behalf of a resource owner, such as client registration information obtained based on communication between the client module 107 and an authorization server/device (e.g., the authorization device 104, etc.)

The client module 107 may receive data/information from the user device 102 associated with accessing a resource owned by and or associated with a user of the user device 102. In some instances, a user of the user device 102 may be resource owner. In some instances, the user device 102 may be a resource owner. A resource owner may be any entity capable of granting access to a protected resource, such as a resource managed by and/or hosted by the resource device 120. When a resource owner is a user of the user device 102, the client module 107 may receive data/information from the user device 102 such as credentials (e.g., username, password, login information, biometric information, etc.) of the resource owner. When a resource owner is the user device 102 (or a device associated with the user device 102), the client module 107 may receive data/information from the user device 102 that are device credentials for the user device 102 (or a device associated with the user device 102), such as a device identifier, an international mobile subscriber identity (IMSI), a media access control address (MAC) address, an international mobile equipment identity (IMEI), a mobile directory number (MDN), a hardware authenticator (e.g., FIDO2, etc.), and/or the like.

The client module 107 may send information associated with the user device 102 (a user of the user device 102, a resource owner, etc.) and/or the client module 107, such as user/device credentials and/or an identifier of the client module 107. The client module 107 may send the information to the authorization device 104 to obtain access information (e.g., an access token, etc.) to access a resource managed by a resource device 120. In some cases, the client module 107 may send any rights/privileges (e.g., scopes, etc.) requested by the client module 107 when accessing resource to the authorization device 104. The client module 107 may be configured (e.g., via client registration, etc.) to authenticate securely with the authorization device 104 to maintain confidentiality of information exchanged between the user device and the client module 107, such as user credentials.

For example, a user of the user device may open a webpage (via the communication element 106) and provide user credentials (e.g., username, password, login information, biometric information, etc.) to a webpage (client module 107, Facebook®, etc.) to access a resource (e.g., stored pictures, messages, etc.) owned by the user and hosted by a resource server (e.g., the resource server 120, etc.). Before the webpage (client module 107, Facebook®, etc.) is able to access the resource, the webpage may send information associated with a user information (e.g., user credentials, etc.) associated with the webpage (e.g., an identifier of the webpage, a client identifier, client secret, registration information, etc.) to an authorization server (the authorization device 104, etc.) to validate the user information and obtain access information (e.g., an access token, etc.).

The authorization device 104 may be disposed locally or remotely relative to the user device 102. The user device 102, the client module 107, and the authorization device 104 (or any other device/component of the system 100) may be in communication via a private and/or public network 105 such as the Internet or a local area network. Other forms of communications may be used such as wired and wireless telecommunication channels. The authorization device 104 may be a server for communicating with the user device 102, the client module 107, the resource device 120, the validation/verification device 122, and/or any other device/component of the system 100. The authorization device 104 may be configured to provide data and/or services, such as user/client authentication/authorization services and/or the like. The authorization device 104 may provide and/or facilitate services such as device, user, and/or client authorization, validation, and/or authentication. In some cases, the authorization device 104 may facilitate, authenticate, and/or authorize functions and/or services such as media management, content services, streaming services, broadband services, or other network-related functions/services. The authorization device 104 may allow the user device 102 and/or the client module 107 to interact with remote resources, such as the resource device 120, and/or any other data, devices, files, and/or the like. The authorization device 104 may be configured as (or disposed at) a central location (e.g., a headend, or processing facility), which may receive, facilitate, authenticate, and/or authorize content (e.g., data, input programming) from multiple sources. The authorization device 104 may facilitate, authenticate, and/or authorize content (combined content) from the multiple sources that may be distributed to users/clients via a distribution system.

The authorization device 104 may include a database 114 to store a plurality of files (e.g., web pages), user identifiers or records, or other information. The database 114 may store information relating to the user device 102 such as the address element 110 and/or the service element 112. The authorization device 104 may obtain the device identifier 108 from the user device 102 and retrieve information from the database 114 such as the address element 110 and/or the service elements 112. The authorization device 104 may obtain the address element 110 from the user device 102 and may retrieve the service element 112 from the database 114, or vice versa. The database 114 may be disposed remotely from the authorization device 104 and accessed via direct or indirect connection. The database 114 may be integrated with the authorization device 104 or some other device or system.

The authorization device 104 may be configured to manage rights/privileges (e.g., scopes, etc.) associated with access a resource, issuance of authorization information (e.g., client registration information, etc.), issuance of access information (e.g., access tokens, etc.), issuance of information associated with access information (e.g., refresh tokens, etc.) and issuance of access tokens. In some cases, the authorization device 104 may receive information associated with the user device 102 (a user of the user device 102, a resource owner, etc.) and/or the client module 107, such as user credentials and/or an identifier of the client module 107. The authorization device 104 may receive the information from the client module 107 to obtain access information (e.g., an access token, etc.) that may be used to access a resource hosted by and/or managed by a resource device 120. In some cases, the authorization device 104 may receive information regarding rights/privileges (e.g., scopes, etc.) requested by the client module 107 to access a resource a resource hosted by and/or managed by a resource device 120. The authorization device 104 may manage the communication between a database 114, the user device 102, the client module 107, the resource device 120, the validation/verification device 122, and/or any other device/component of the system 100 for sending and receiving data therebetween.

The database 114 may store data/information associated with a user, the user, device 102, the client module 107, the resource 120, and/or the like. The database 114 may store access information (e.g., access tokens, refresh tokens, etc.) that may be associated with a user, the user, device 102, the client module 107, the resource 120, and/or the like. In some instances, the user device 102, the client module 107, the resource device 120, the validation/verification device 122, and/or any other device/component of the system 100 may request and/or retrieve data/information, such as an access token, a refresh token, and/or the like based on data/information stored in and/or associated with the database 114. The database 114 may store mappings between access information (e.g., access tokens, refresh tokens, etc.) and rights/privileges/authorizations (e.g., scopes, etc.) that are assigned to the access information. Any information may be stored in and retrieved from the database 114. For example, a user of the user device 102 may interact with the communication element 106 (e.g., user opens a webpage) to provide user credentials (e.g., username, password, login information, biometric information, etc.) to access a resource (e.g., stored pictures, messages, etc.) owned by the user and hosted by the resource server 120.

To access a resource, the client module 107 may send user/device credentials obtained via the user device 102, information associated with the client module 107 (e.g., an identifier of the webpage, a client identifier, client secret, registration information, etc.), and/or any other related data/information to the authorization device 104 to obtain access information (e.g., access token, etc.). In some instances, the authorization device 104 may only provide the client module 107 access information (e.g., access token, etc.) when the user/device credentials obtained via the user device 102, information associated with the client module 107 (e.g., an identifier of the webpage, a client identifier, client secret, registration information, etc.), and/or any other related data/information is validated, verified, and/or authorized (via an authorization grant process). If the authorization device 104 is unable to validate any information received from the client module 107, then the authorization process may be halted, one or more error messages may be generated, and/or other security measures may be taken.

In some instances, the authorization device 104 may only provide the client module 107 access information (e.g., access token, etc.) when the client module 107 possesses, and/or presents valid temporary access information (e.g., a refresh token, etc.), such as temporary access information that has not expired, been revoked, or is otherwise invalid. In some instances, when the client module 107 possesses, and/or presents valid temporary access information (e.g., a refresh token, etc.), the authorization device 104 may provide the client module 107 invalid access information (e.g., invalid access token, etc.). Invalid access information (e.g., invalid access token, etc.) may include data/information that resembles valid access information but has a portion of the data/information changed to render it invalid when presented to the resource device 120, such as an invalid signature and/or identity of an identity broker (e.g., the authorization device 104, the resource device 120, etc.). The client module 107 may be unaware that the invalid access information (e.g., invalid access token, etc.) is invalid, and may attempt to use the invalid access information (e.g., access token, etc.) to access a resource to no avail until the authorization device 104 validates user/device credentials received from the client module 107. The client module 107 may attempt to use the invalid access information (e.g., access token, etc.) to access a resource to no avail until the authorization device 104 validates user/device credentials received from the client module 107 to avoid security issues associated with undergoing a reauthorization process (e.g., authorization grant) that may require a current communication session between the user device 102, the client module 107, the authorization device 104, and/or any other device/component of the system 100 to terminate and a process of obtaining user credentials and other related data/information to restart.

The authorization device 104 may validate user/device credentials by communicating with a validation/verification device 122. In some instances, the validation/verification device 122 may be included with and/or associated with the user device 102. In some instances, the validation/verification device 122 may be a device separate from the user device 102. The validation/verification device 122 may receive request from authorization device 104 to validate user/device credentials whenever access to a protected resource is requested by a client (e.g., the client module 107, etc.). In some instances, the authorization device 104 send a push notification to the validation/verification device 122 to validate user/device credentials. Upon receiving a push notification from the authorization device 104, the validation/verification device 122 may use various methods to validate a user (resource owner) and/or a device (e.g., the user device 102, etc.) whenever access to a protected resource is requested by a client (e.g., the client module 107, etc.). In some instances, the validation/verification device 122 may obtain user/device credentials from the owner of a resource for which the client module 107 may be requesting to access. For example the client (e.g., the client module 107, etc.) requesting to access the protected resource may be associated with the user device 102, and the validation/ verification device 122 may be a device (e.g., computing device, laptop, desktop, smart device, etc.) associated with the user device 102 that may be used to obtain credentials from the user (resource owner). In some instances, the validation/verification device 122 may cause a notification, pop-up window, message, and/or the like to be displayed by an interface. Credentials (user credentials, login information, etc.) may be provided/obtained via the interface.

To access a resource managed by and/or hosted by the resource device 120, the client module 107 may present access information (e.g., an access token, etc.) received from the authorization device 104 to the resource device 120. In some instances, the client module 107 may receive temporary access information (e.g., a refresh token, etc.) from the authorization device 104 along with access information (e.g., an access token, etc.). In some instances, access information (e.g., an access token, etc.) may have a specified duration/longevity after which it expires, and temporary access information (e.g., a refresh token, etc.) may have an extended duration/longevity relative to the access information. For example, temporary access information may be a long-lived token.

The client module 107 may store the temporary access information along with the related access information. Thereafter, if the resource server 120 determines that access information received from the client module 107 is expired (or invalid), the client module 107 may present the refresh token to the authorization device 104 (or the resource device 120) resource server to obtain new access information, such as a new access token. For example, the client module 107 may use the access information (e.g., an access token, etc.) to access the resource until the access information (e.g., an access token, etc.) is invalid, expired, revoked, and/or the like. When access information (e.g., an access token, etc.) is invalid, expired, revoked, and/or the like the client module 107 may request new access information (e.g., a new access token, etc.) from the authorization device 104.

In some instances, when the client module 107 requests new access information (e.g., a new access token, etc.) from the authorization device 104, the authorization device 104 may determine is the request includes valid temporary access information (e.g., a refresh token, etc.), such as temporary access information that is not invalid, expired, revoked, and/or the like. When the request includes valid temporary access information (e.g., a refresh token, etc.), the authorization device 104 may provide the client module 107 invalid access information (e.g., invalid access token, etc.). The client module 107 may attempt to use the invalid access information (e.g., access token, etc.) to access a resource (to no avail) until the authorization device 104 validates user/ device credentials received from the client module 107. When the authorization device 104 validates the user/device credentials received from the client module 107, the authorization device 104 may send valid access information (e.g., a valid access token, etc.) to the client module 107 to access the resource.

Figure 2:
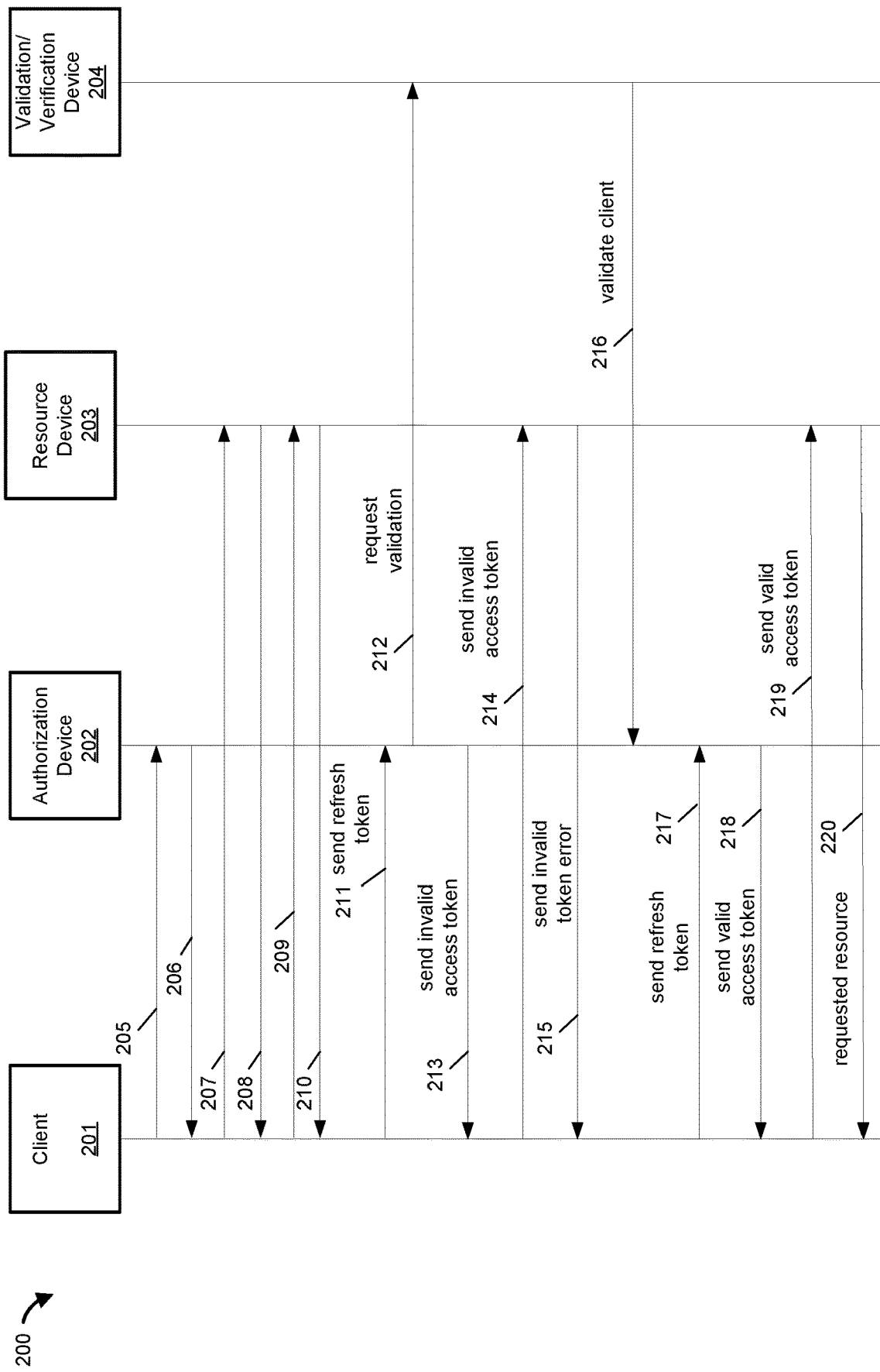
FIG. 2 shows a diagram for accessing a resource.

FIG. 2 shows a diagram for accessing a resource. As an example, a user of a user device (e.g., the user device 102, etc.) may access a client 201 (e.g., a client application, webpage, browser, online interface, desktop application, mobile application, the client module 107, etc.). The client 201 may be associated with a website (e.g., online page/site, social media page/outlet, web application, a user-agent based application, a native application, a mobile application, etc.), such as an online marketplace that allows the user to purchase an item, content, and/or the like. To make a purchase via the client 201, the user may be required to register and/or create an account. The client 201 may require certain information from the user to complete a registration process, such as data/information that may be managed, hosted, and/or stored by a resource device 203. To access the data/information managed, hosted, and/or stored by a resource device 203, the client 201 may be required to present an access token to the resource device 203.

To obtain an access token, the user (the client 201) may be directed to an authorization device 202 (e.g., the authorization device 104, etc.). The user and the authorization device 202 may share a trust relationship. The client 201 may send an authorization code request to the authorization device 202. An authorization code request may include data/information that identifies the user and/or the user device, such as user credentials and/or device credentials. The authorization code request may include data/information that identifies the client 201, such as a client identifier and/or client secret. For example, the online webpage of a social media platform (e.g., Facebook®, etc.) may direct a web browser to an authorization endpoint (e.g., the authorization device 202, the authorization device 104, etc.) Based on receiving user credentials, the client identifier (and client secret), and any other related data/information, the authorization device 202 may send the client 201 an authorization code. At 205, when the client 201 has a valid an authorization code, it may send the authorization code along with a request for an access token to the authorization device 202.

The authorization device 202 may receive the request for the access token and validate the authorization code. At 206, after a successful validation, the authorization device 202 may send an access token and optionally a refresh token to the client. At 207, the client 201 may send the access token to the resource device 203 to request access to the resource. In some instances, the access token may have a specified duration/longevity after which it expires, and the refresh token may have an extended duration/longevity relative to the access information. For example, refresh token may be a long-lived token. At 208, the client 201 may access the resource. The client 201 may continue to access the resource associated with the resource device 203 until the access token is expired, revoked, or is otherwise invalid. In some instances, when the access token is expired, revoked, or is otherwise invalid, the refresh token provided to the client 201 may revoked to prevent the client 201 from accessing the resource managed by and/or hosted by the resource device 203, and the user may be required to provide user credentials and/or the client 201 may have to again authenticate (obtain an authorization code grant) with the authorization device 202. For example, when the access token is expired, revoked, or is otherwise invalid, to access the resource, a login procedure acquiring user credentials and/or restarting a communication session may be required. In some instances, when the access token is expired, revoked, or is otherwise invalid, and the refresh token is not expired, revoked, or is otherwise invalid, the client 201 may, at 209, request a new access token to access the resource associated with the resource device 203 without having to exchange user credentials, authenticate the client 201 (obtain an authorization code grant), login (re-login) to multiple applications that may be associated with the client 201, and/or restart a communication session with the authorization device 202. Having to exchange user credentials, authenticate the client 201 (obtain an authorization code grant), login (re-login) to multiple applications that may be associated with the client 201, and/or restarting a communication session with the authorization device 202 is avoided because such actions may cause credentials (user credentials, device credentials, etc.) more susceptible to phishing and/or similar attacks.

At 210, when the client 201 attempt to access the resource when the access token is expired, revoked, or is otherwise invalid, the resource device 203 may send an invalid token error to the client 201. At 211, when the access token is expired, revoked, or is otherwise invalid, and the refresh token is not expired, revoked, or is otherwise invalid, and/or the invalid token error is received, the client 201 may send the refresh token to the authorization device 202. The authorization device 202 may determine if the refresh token is valid by determining that the refresh token has a valid signature from an issuer of the refresh token and/or that the refresh token has not expired.

At 212, when the client 201 sends a valid refresh token to the authorization device 202, the authorization device 202 may immediately send a signal (e.g., a push notification, a message, a notification, etc.) to a validation/verification device 204 (e.g., the validation/verification device 122, etc.). In some instances, the validation/verification device 122 may be included with and/or associated with the user device (e.g., the user device 102, etc.). In some instances, the validation/verification device 204 may be a device separate from the user device. In some instances, the validation/verification device 204 include an application and/or programming interface (API).

At 213, when the authorization device 202 sends the signal (e.g., push notification, message, notification, etc.) to the validation/verification device 204 (e.g., the validation/verification device 122, etc.), the authorization device 202 may also send an invalid access token to the client 201. The client module 107 may be unaware that the invalid access token is invalid. The invalid access token may be coded with and/or contain data/information that resembles a valid access token. The invalid access token may be invalid because it may not include a valid signature from a token issuer, or may not be associated with one or more rights/privileges (e.g., scopes, etc.) required to access the resource.

At 214, the client 201 may send invalid access token to the resource device 203 to access the resource. At 215, the resource device 203 may determine that the invalid access token is invalid, and send an invalid access token error to the client 201. The client 201 may continue to try to access the resource by sending the invalid access token to the resource device 203 because the client 201 is unaware that the invalid access token is invalid. The client 201 may attempt to use the invalid access token to access the resource to no avail until the authorization device 202 receives an indication from the validation/verification device 204 that the client is valid. In some instances, the steps of the client 201 attempting to use the invalid access token (208), receiving an invalid token error (209), sending the refresh token (205) to the authorization device 202, and again attempting to use an invalid access token (208), may be repeated as long as the refresh token is valid.

At 216, the validation/verification device 204 may validate the client 201 and send an indication that the client 201 is valid to the authorization device 202. The validation/verification device 204 may validate the client 201 by requesting user/device credentials from the owner (user, user device, etc.) of the resource associated with the resource device 203. In some instances, validating the client 201 may include a multi-factor authentication of the client 201 and/or user. In some instances, validating the client 201 may include causing a multi-factor authentication (MFA) application to initiate on the validation/verification device 204 and/or the user device (e.g., the user device 102, etc.). For example, the validation/verification device 204 may request credentials and/or initiate one or more actions (e.g., device location identification, device identify verification, etc.) via the multi-factor authentication (MFA) application. If the MFA approves the one or more actions (e.g., the actions are validated, a valid device identification is determined, etc.), the validation/verification device 204 cause a pop-up interface to presented to the owner of the resource that may be used to collect/obtain credentials that may be used to validate the client 201. In some instances, validating the client 201 may include the validation/verification device 204 sending a pre-enrolled/authorized device identity/access token to the authorization device 202.

At 217, the client 201 may send the refresh token to the authorization device 202 to access the resource. At 218, the authorization device 202, based on receiving the indication from the validation/verification device 204 that the client 201 is valid, the authorization device 202, may send the client 201 a valid access token.

At 219, the client 201 may send and/or present the valid access token to the resource device 203. At 220, the resource device 203 may enable the client 201 to access the resource.

Figure 3:
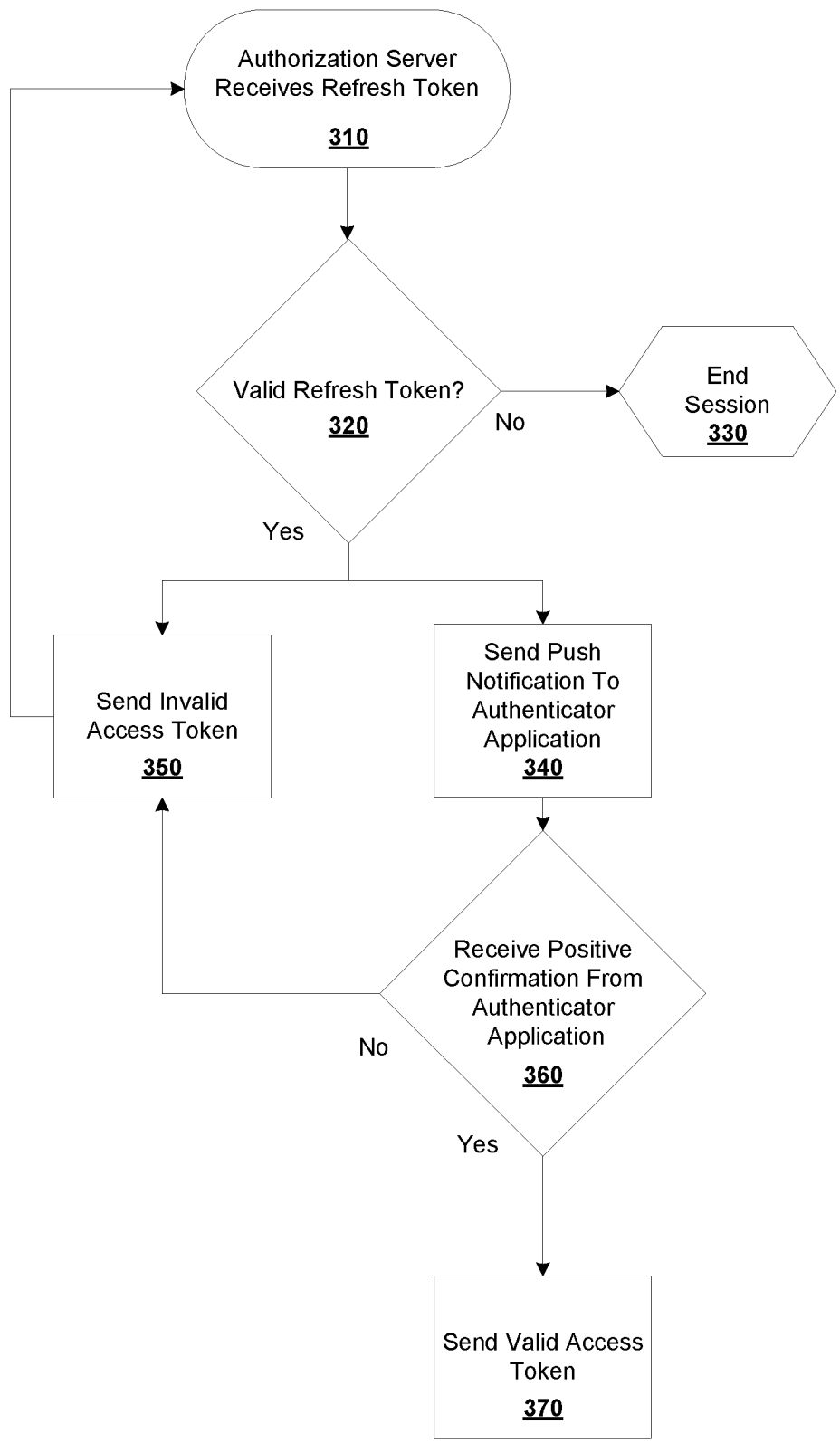
FIG. 3 shows a flowchart for accessing a resource.

FIG. 3 shows a flowchart for accessing a resource. A client (e.g., client application, webpage, browser, online interface, desktop application, mobile application, the client module 107, the client 201, etc.) that has been denied access to a resource based on an invalid access token may send a refresh token to an authorization server (e.g., an OAUTH authorization server, an AuthZ server, the authorization device 104, the authorization device 202, etc.) in an attempt to reestablish access to the resource. The authorization server may receive the refresh token at 310.

At 320, the authorization server may determine whether the refresh token is valid. When the client has a valid refresh token, the client may request a new access token to access the resource without a user/user device having to exchange/provide credentials. A valid refresh token is a refresh token that is not expired, revoked, and/or otherwise invalid. The authorization server may determine that the refresh token is valid by determining that the refresh token has a valid signature (from an issuer of the refresh token) and/or that the refresh token has not expired. If the authorization server determines that the refresh token is expired, revoked, and/or otherwise invalid (e.g., does not have a valid signature, etc.), then at 330, the communication session is terminated. If the authorization server determines that the refresh token is valid, then the authorization server may determine if the client is authorized (by a resource owner) to access the resource.

At 340, the authorization server may send a signal (e.g., a push notification, a message, a notification, etc.) to an authenticator application to determine if the client is authorized (by a resource owner) to access the resource. The authenticator application may be an application implemented on a validation/verification device. In some instances, the validation/verification device may be the same device as the user device. In some instances, the validation/verification device may be a device separate from the user device. The authenticator application may verify/determine credentials associated with the resource owner. In some instances, the resource owner may be a user and the client may be validated based on user credentials (e.g., username, password, etc.) associated with the user. In some instances, the resource owner may be a user device and the client may be validated based on device credentials (e.g., a device identifier, etc.) associated with the user device. The authenticator application may request user/device credentials from the resource owner (e.g., the user/user device, etc.). In some instances, validating the client may include a multi-factor authentication. For example, validating the client may include the authenticator application causing a multi-factor authentication (MFA) process to initiate on the validation/verification device. For example, the authenticator application may request credentials and/or initiate one or more actions (e.g., device location identification, device identify verification, etc.). If the authenticator application receives the credentials and approves the one or more actions (e.g., the actions are validated, a valid device identification is determined, etc.), the authenticator application device may cause a pop-up interface on the validation/verification device to presented to the owner of the resource. The pop-up interface may be used to collect/obtain credentials that may be used to validate the client.

At 350, the authentication server may send an invalid access token to the client. The client is unaware that the invalid access token is invalid. The invalid access token may be coded with and/or contain data/information that resembles a valid access token. The invalid access token may be invalid because it may not include a valid signature from a token issuer, or may not be associated with one or more rights/privileges (e.g., scopes, etc.) required to access the resource. The client may send the invalid access token to the resource device to access the resource. The resource device may determine that the invalid access token is invalid, and send an invalid access token error to the client.

At 360, when the authorization server sends the signal (e.g., push notification, message, notification, etc.) to the validation/verification device (step 340), the authorization server may determine if a positive confirmation that the client is validated (e.g., user/device credentials verified, etc.) is received from the authenticator application. If a positive confirmation of the validity of the client is not received, then the process may return to 350, where the authentication server may send an invalid access token to the client. In some instances, if a positive confirmation of the validity of the client is not received, then the authentication server may not send an invalid access token to the client and the client may continue to try to access the resource. The client may continue to try to access the resource by providing/sending the refresh token to the authorization server (at 310) (and in some instances, receiving an invalid access token (at 350)) until the refresh token is expired, revoked, and/or invalid, or until the authentication server receives positive confirmation from the authenticator application (step 340).

At 370, when the authorization server receives positive confirmation from the authenticator application that the credentials of the resource owners have been verified and/or that the client is valid/authenticated, the authorization server may send the client a valid access token. The client may provide/send the valid access token to the resource device to access the resource.

Figure 4:
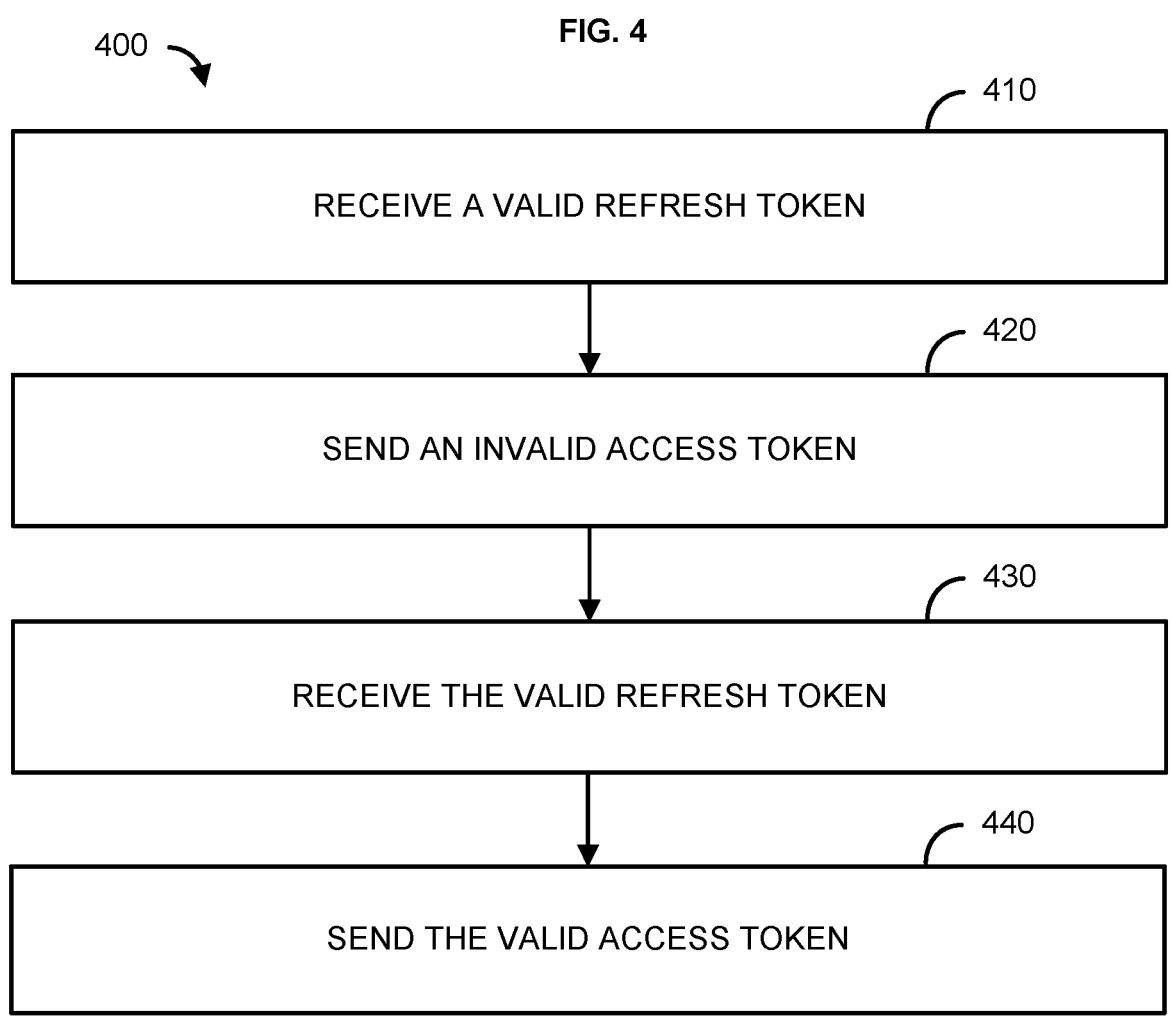
FIG. 4 shows a flowchart of a method for accessing a resource.

FIG. 4 shows a flowchart of a method 400 for accessing a resource. To access a resource, a resource owner (user) may use a client (e.g., client application, webpage, browser, online interface, desktop application, mobile application, etc.). For example, a user of a user device (e.g., user device 102, etc.) may open a webpage (e.g., a client application, the client module 107, etc.) to access a resource, such as pictures, a contact list, and/or the like that may be stored by a resource entity (e.g., Facebook®, Google®, etc.). The resource may be protected (e.g., secured) by the resource entity, and an access token may be required to access the resource.

To obtain an access token, the client may communicate with an authorization device (e.g., an authorization server, the authorization device 104, etc.) to obtain an authorization code. The client may provide the authorization device with data/information that identifies the resource owner, the client, and an indication that the client is associated with the resource owner. A trust relationship may exist between the resource owner and the authorization device. For example, the resource owner may be authenticated with the authorization device. Because the client is associated with a resource owner that shares a trust relationship with the authorization device, the authorization device may send the client the requested authorization code. The client may then send the authorization code to the authorization device along with a request for an access token to access the resource. The authorization server may validate the authorization code and send the client the access token and a refresh token. The access token may have a specified duration/longevity after which it expires, and the refresh token may have an extended duration/longevity relative to the access information. The refresh token may be a long-lived token. When the access token expires, the client may be prevented from accessing the resource. The client may use the refresh token to request a new access token.

At 410, a valid refresh token may be received. The authorization server may receive the refresh token via the user device. For example, the authorization server may receive the refresh token from the user device (via the client, etc.). In some instances, the authorization server may receive a valid access token, such as the access token originally provided by the authorization device, and a valid refresh token from the user device (via the client, etc.) whenever the user device and/or client is attempting to access the resource. In some instances, the authorization server may receive the refresh token based on a failed attempt by the user device (via the client, etc.) to access the resource using the access token originally provided by the authorization device. For example, the user device (via the client, etc.) may be unable to access the resource because the access token may be expired, revoked, invalid, and/or the like.

At 420, an invalid access token may be sent. The authorization device may send the invalid access token to the user device. For example, instead of revoking the refresh token when the access token expires, is revoked, or is invalid, the authorization device may determine that the refresh token received via the user device is valid. The authorization device may send the invalid access token to the user device (via the client, etc.) based on determining that the refresh token is valid (e.g., the refresh token has not expired).

The authentication device may determine and/or generate the valid access token, for example, based on verifying (via authentication information) the user/user device (e.g., the resource owner, etc.). To ensure that the user device and/or the client is trustworthy and/or to improve security of the communication session (when the client is accessing and/or attempting to access the resource), the authentication device may verify the user device and/or the identity of the resource owner. The authentication device may verify the user device and/or the identity of the resource owner before determining and/or generating the valid access token. For example, when the authorization device sends the user device (via the client, etc.) the invalid access token, the authorization device may send (or cause another device, server, verification entity, etc. to send) a signal to the resource owner to request authentication information to verify the identity of the resource owner. In some instances, the signal sent to the resource owner may be a push notification. In some instances, the signal sent to the resource owner may be a message, an email, a text message, phone call, and/or any other signal/notification. The signal may cause the resource owner to authenticate by providing credentials, such as a username, a password (or passwordless authentication element such as FIDO2, etc.), biometric information, a device identifier, a user identifier, or any other identifying information. The authentication device, based on verifying the identity of the resource owner, may determine and/or generate the valid access token.

At 430, the valid refresh token may be received. The authentication device may receive the valid refresh token from the user device (via the client, etc.). The user device (via the client, etc.) may send the valid refresh token to the authorization device based on another failed attempt to access the resource. For example, an invalid access token error message may be sent to the user device (via the client, etc.) when the user device sends the invalid access token to the resource entity to access the resource. Assuming the refresh token is still valid, the invalid access token error may cause the user device (via the client, etc.) to send the valid refresh token to the authorization device to obtain a new access token.

At 440, the valid access token may be sent. The authentication device may send the valid access token to the user device (via the client, etc.). The user device (via the client, etc.) may receive the valid access token from the authentication device based on sending the valid refresh token to the authentication device and the authentication device determining a positive identity of the resource owner and/or authentication of the user device. Based on the positive identification and/or authentication, the authentication device may send the valid access token to the user device (via the client, etc.). The user device (via the client, etc.) may access the resource. The user device (via the client, etc.) may send the valid access token to the resource entity. The resource entity may determine that the access token is valid. The resource entity, based on determining that valid access token is valid, may allow the user device (via the client, etc.) to access the resource.

Figure 5:
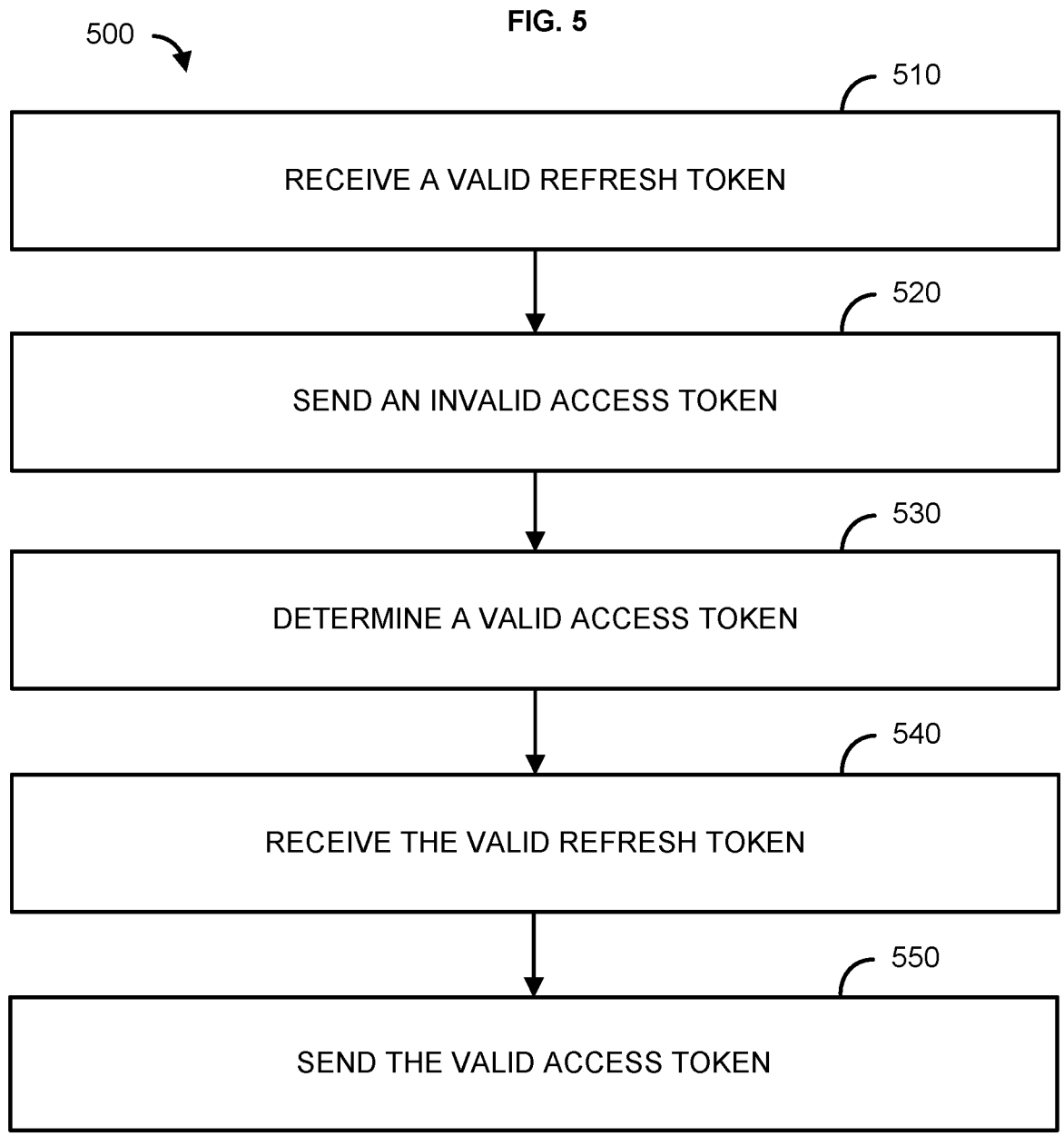
FIG. 5 shows a flowchart of a method for accessing a resource.

FIG. 5 shows a flowchart of a method 500 for accessing a resource. To access a resource, a resource owner (user) may use a client (e.g., client application, webpage, browser, online interface, desktop application, mobile application, etc.). For example, a user of a user device (e.g., user device 102, etc.) may open a webpage (e.g., a client application, the client module 107, etc.) to access a resource, such as pictures, a contact list, and/or the like that may be stored by a resource entity (e.g., Facebook®, Google®, etc.). The resource may be protected (e.g., secured) by the resource entity, and an access token may be required to access the resource.

To obtain an access token, the client may communicate with an authorization device (e.g., an authorization server, the authorization device 104, etc.) to obtain an authorization code. The client may provide the authorization device with data/information that identifies the resource owner, the client, and an indication that the client is associated with the resource owner. A trust relationship may exist between the resource owner and the authorization device. For example, the resource owner may be authenticated with the authorization device. Because the client is associated with a resource owner that shares a trust relationship with the authorization device, the authorization device may send the client the requested authorization code. The client may then send the authorization code to the authorization device along with a request for an access token to access the resource. The authorization server may validate the authorization code and send the client the access token and a refresh token. The access token may have a specified duration/longevity after which it expires, and the refresh token may have an extended duration/longevity relative to the access information. The refresh token may be a long-lived token. When the access token expires, the client may be prevented from accessing the resource. The client may use the refresh token to request a new access token.

At 510, a valid refresh token may be received. The authorization server may receive the refresh token. In some instances, the authorization server may receive a valid access token, such as an access token originally provided by the authorization server to the user device (via the client, etc.), and the refresh token (e.g., valid refresh token) from the user device (via the client, etc.) whenever the user device (via the client, etc.) is attempting to access the resource. In some instances, the authorization server may receive the refresh token based on a failed attempt by the user device (via the client, etc.) to access the resource using the access token originally provided by the authorization server. For example, the user device (via the client, etc.) may be unable to access the resource because the access token may be expired, revoked, invalid, and/or the like.

At 520, an invalid access token may be sent. The authorization device may send the invalid access token to the user device (via the client, etc.). For example, instead of revoking the refresh token when the access token expires, is revoked, or is invalid, the authorization device may determine that the refresh token received from the user device (via the client, etc.) is valid. The authorization device may send the invalid access token to the user device (via the client, etc.) based on determining that the refresh token is valid (e.g., the refresh token has not expired).

At 530, a valid access token may be determined. The authentication device may determine and/or generate the valid access token, for example, based on verifying (via authentication information) the user/user device (e.g., the resource owner, etc.). To ensure that the user device and/or client is trustworthy and/or to improve security of the communication session (when the user device/client is accessing and/or attempting to access the resource), the authentication device may verify the identity of the resource owner. The authentication device may verify the identity of the resource owner before determining and/or generating the valid access token. For example, when the authorization device sends the user device (via the client, etc.) the invalid access token, the authorization device may send (or cause another device, server, etc. to send) a signal to the resource owner to request authorization information to verify the identity of the resource owner. In some instances, the signal sent to the resource owner may be a push notification. In some instances, the signal sent to the resource owner may be a message, an email, a text message, phone call, and/or any other signal/notification. The signal may cause the resource owner to identify by providing authorization information (credentials), such as a username, a password (or passwordless authentication element such as FIDO2, etc.), biometric information, a device identifier, a user identifier, or any other identifying information. The authentication device, based on verifying the identity of the resource owner (via the authorization information), may determine and/or generate the valid access token.

At 540, the valid refresh token may be received. The authentication device may receive the valid refresh token from the user device (via the client, etc.). The user device (via the client, etc.) may send the valid refresh token to the authorization device based on another failed attempt to access the resource. For example, an invalid access token error message may be sent to the user device (via the client, etc.) when the user device (via the client, etc.) sends the invalid access token to the resource entity to access the resource. Assuming the refresh token is still valid, the invalid access token error may cause the user device (via the client, etc.) to send the valid refresh token to the authorization device to obtain a new access token.

At 550, the valid access token may be sent. The authentication device may send the valid access token to the user device (via the client, etc.). The user device (via the client, etc.) may receive the valid access token from the authentication device based on sending the valid refresh token to the authentication device and the authentication device determining a positive identity of the resource owner. When the authentication device positively identifies the resource owner as being associated with the user device and/or client, the authentication device may send the valid access token to the user device (via the client, etc.). The user device (via the client, etc.) may access the resource. The user device (via the client, etc.) may send the valid access token to the resource entity. The resource entity may determine that the access token is valid. The resource entity, based on determining that valid access token is valid, may allow the client to access the resource.

Figure 6:
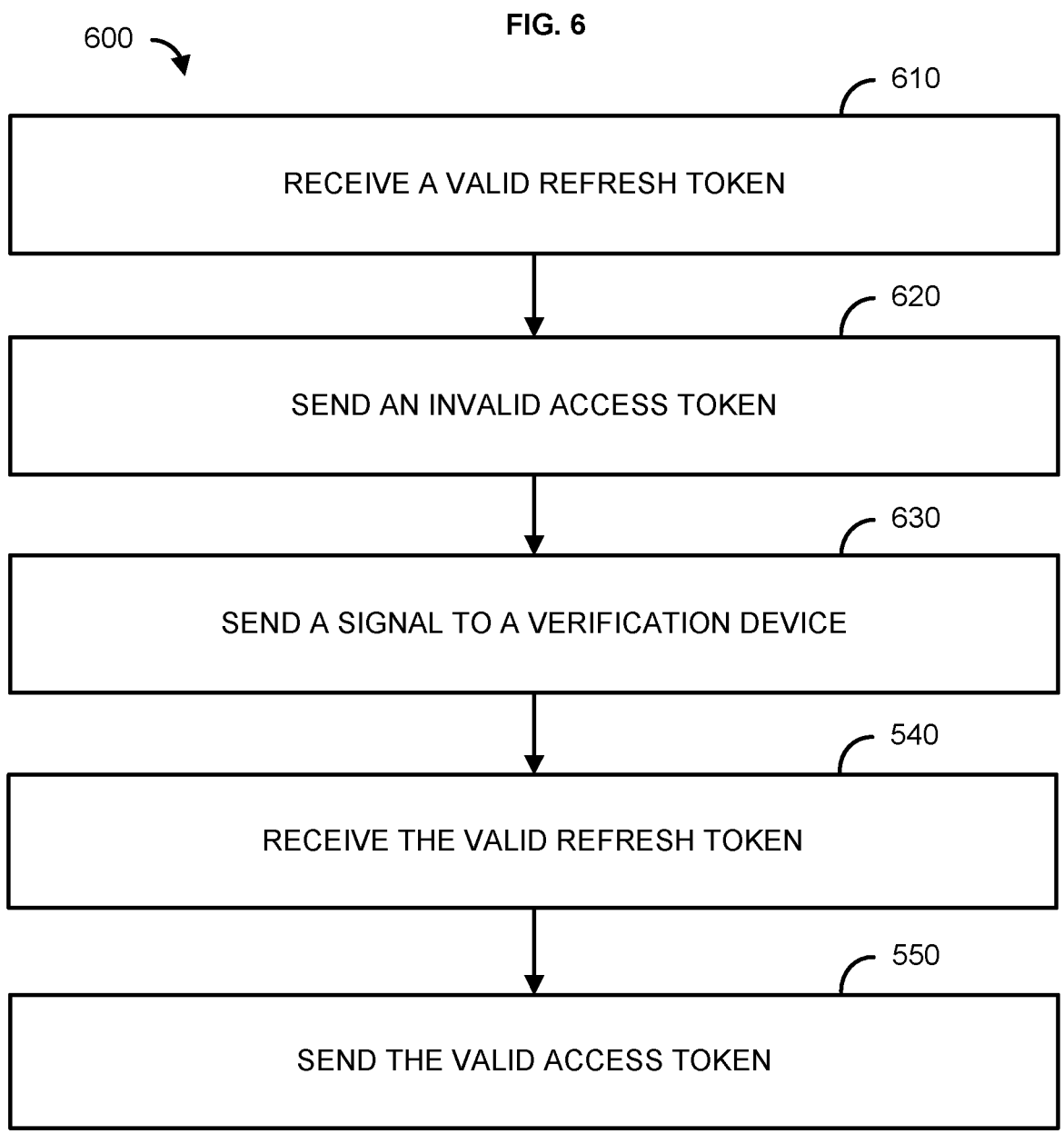
FIG. 6 shows a flowchart of a method for accessing a resource.

FIG. 6 shows a flowchart of a method for accessing a resource. To access a resource, a resource owner (user) may use a client (e.g., client application, webpage, browser, online interface, desktop application, mobile application, etc.). For example, a user of a user device (e.g., user device 102, etc.) may open a webpage (e.g., a client application, the client module 107, etc.) to access a resource, such as pictures, a contact list, and/or the like that may be stored by a resource entity (e.g., Facebook®, Google®, etc.). The resource may be protected (e.g., secured) by the resource entity, and an access token may be required to access the resource.

To obtain an access token, the client may communicate with an authorization device (e.g., an authorization server, the authorization device 104, etc.) to obtain an authorization code. The client may provide the authorization device with data/information that identifies the resource owner, the client, and an indication that the client is associated with the resource owner. A trust relationship may exist between the resource owner and the authorization device. For example, the resource owner may be authenticated with the authorization device. Because the client is associated with a resource owner that shares a trust relationship with the authorization device, the authorization device may send the client the requested authorization code. The client may then send the authorization code to the authorization device along with a request for an access token to access the resource. The authorization server may validate the authorization code and send the client the access token and a refresh token. The access token may have a specified duration/longevity after which it expires, and the refresh token may have an extended duration/longevity relative to the access information. The refresh token may be a long-lived token. When the access token expires, the client may be prevented from accessing the resource. The client may use the refresh token to request a new access token.

At 610, a valid refresh token may be received. The authorization server may receive the refresh token via the user device. In some instances, the authorization server may receive a valid access token, such as an access token originally provided by the authorization server to the user device (via the client, etc.), and the refresh token (e.g., a valid refresh token) from the user device (via the client, etc.) whenever the user device/client is attempting to access the resource. In some instances, the authorization server may receive the refresh token based on a failed attempt by the user device (via the client, etc.) to access the resource using the access token originally provided by the authorization server. For example, the user device (via the client, etc.) may be unable to access the resource because the access token may be expired, revoked, invalid, and/or the like.

At 620, an invalid access token may be sent. The authorization device may send the invalid access token to the user device (via the client, etc.). For example, instead of revoking the refresh token when the access token expires, is revoked, or is invalid, the authorization device may determine that the refresh token received from the user device (via the client, etc.) is valid. The authorization device may send the invalid access token to the user device (via the client, etc.) based on determining that the refresh token is valid (e.g., the refresh token has not expired).

At 630, a signal may be sent to a verification device. The authentication device may send the signal to the verification device. To ensure that the user device and/or client is trustworthy and/or to improve security of the communication session (when the user device (via the client, etc.) is accessing and/or attempting to access the resource), the authentication device may verify the identity of the resource owner by sending the signal to the verification device. The authentication device may verify the identity of the resource owner before determining and/or generating the valid access token. For example, when the authorization device sends the user device (via the client, etc.) the invalid access token, the authorization device send the signal to the resource owner to request authorization information to verify the identity of the resource owner. In some instances, the signal sent to the resource owner may be a push notification. In some instances, the signal sent to the resource owner may be a message, an email, a text message, phone call, and/or any other signal/notification. The signal may cause the resource owner to identify by providing authorization information (credentials), such as a username, a biometric (e.g., fingerprint, facial recognition, voice print, etc.), a password (or passwordless authentication element such as FIDO2, etc.), a device identifier, a user identifier, or any other identifying information. The authentication device, based on verifying the identity of the resource owner (via the authorization information), may determine and/or generate the valid access token.

At 640, the valid refresh token may be received. The authentication device may receive the valid refresh token from the user device (via the client, etc.). The user device (via the client, etc.) may send the valid refresh token to the authorization device based on another failed attempt to access the resource. For example, an invalid access token error message may be sent to the user device (via the client, etc.) when the user device (via the client, etc.) sends the invalid access token to the resource entity to access the resource. Assuming the refresh token is still valid, the invalid access token error may cause the user device (via the client, etc.) to send the valid refresh token to the authorization device to obtain a new access token.

At 650, the valid access token may be sent. The authentication device may send the valid access token to the user device (via the client, etc.). The user device (via the client, etc.) may receive the valid access token from the authentication device based on sending the valid refresh token to the authentication device and the authentication device determining a positive identity of the resource owner. When the authentication device positively identifies the resource owner as being associated with the user device (via the client, etc.), the authentication device may send the valid access token to the user device (via the client, etc.). The user device (via the client, etc.) may access the resource. The user device (via the client, etc.) may send the valid access token to the resource entity. The resource entity may determine that the access token is valid. The resource entity, based on determining that valid access token is valid, may allow the user device (via the client, etc.) to access the resource.

Figure 7:
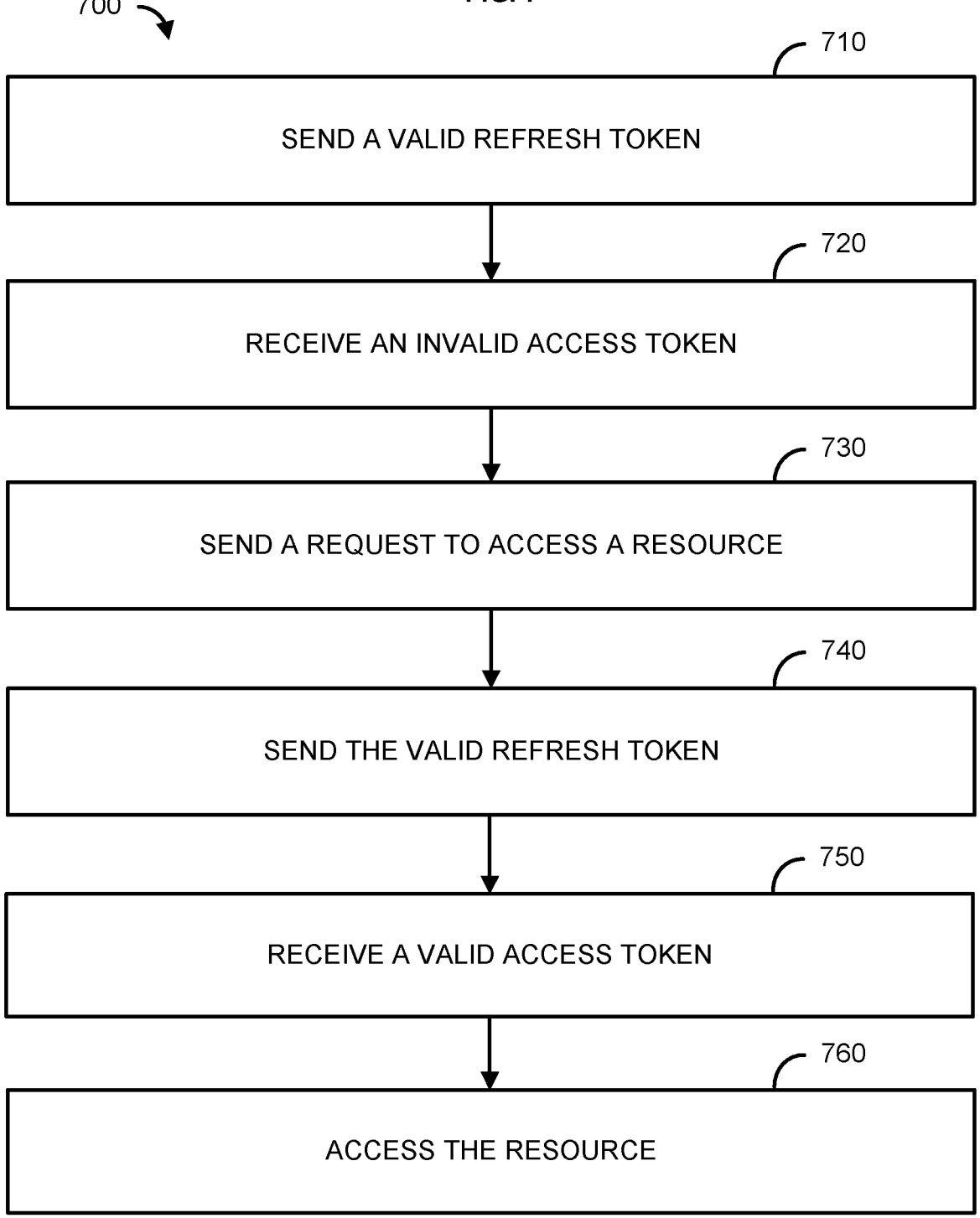
FIG. 7 shows a flowchart of a method for accessing a resource.

FIG. 7 shows a flowchart of a method for accessing a resource. A client (e.g., client application, webpage, browser, online interface, desktop application, mobile application, etc.) may need to access a resource. The client may request access and permissions from a resource owner (user). For example, the client may cause an interface to be presented to the user that requests user credentials. The resource owner may authenticate the client with an authorization device (e.g., an authorization server, the authorization device 104, etc.) and give the client permission to access the resource by providing the user credentials. The authorization device may issue an access token and a refresh token to the client. The access token may have a specified duration/longevity after which it expires, and the refresh token may have an extended duration/longevity relative to the access token. To access the resource, the client may present the access token to a resource entity (e.g., the resource device 120, etc.) that manages and/or host the resource. The client may access the resource by presenting the access token to the resource entity until the access token expires, is revoked, or is invalid. When the access token expires, is revoked, or is invalid, the client may present the refresh token to the authorization device to request a new access token.

At 710, the refresh token may sent. The user device (via the client, etc.) may send the refresh token to the authorization device. The user device (via the client, etc.) may send the refresh token to the authorization device based on a failed attempt to access the resource. For example, the user device (via the client, etc.) may be unable to access the resource because the access token may be expired, revoked, invalid, and/or the like.

At 720, an invalid access token may be received. The user device (via the client, etc.) may receive the invalid access token from the authorization device (or a device associated with the authorization device). Instead of revoking the refresh token when the access token expires, is revoked, or is invalid, the authorization device may determine that the refresh token received from the user device (via the client, etc.) is valid. The authorization device may send the invalid access token to the user device (via the client, etc.) based on determining that the refresh token is valid (e.g., the refresh token has not expired). The user device and/or the client may be unable to determine that the access token received is an invalid access token, for example, the invalid access token status may be indeterminable, based on encryption/encoding, protected, and/or the like.

To ensure that the user device and/or the client is trustworthy and/or to improve security of the communication session (when the user device (via the client, etc.) is accessing and/or attempting to access the resource), when the authorization device sends the user device (via the client, etc.) the invalid access token, the authorization device send a signal to the resource owner to request authorization information to verify the identity of the resource owner. In some instances, the signal sent to the resource owner may be a push notification. In some instances, the signal sent to the resource owner may be a message, an email, a text message, phone call, and/or any other signal/notification. The signal may cause the resource owner to identify by providing authorization information (credentials), such as a username, a biometric (e.g., fingerprint, facial recognition, voice print, etc.), a password (or passwordless authentication element such as FIDO2, etc.), a device identifier, a user identifier, or any other identifying information.

At 730, a request to access the resource may be sent. The user device (and/or the client) may be unaware that the invalid access token received from the authorization device is invalid, and may send the access token to the resource entity in attempt to access the resource. For example, the user device (and/or the client) may be unable to determine that the access token is an invalid access token, for example, the invalid access token status may be indeterminable, based on encryption/encoding, protected, and/or the like.

At 740, the refresh token may sent. The user device (via the client, etc.) may send the refresh token to the authorization device based on another failed attempt to access the resource. For example, an invalid access token error message may be sent to the user device (via the client, etc.) trying to use the invalid access token to access the resource. Assuming the refresh token is still valid, the invalid access token error may cause the user device (via the client, etc.) to send the refresh token to the authorization device.

At 750, a valid access token may be received. The user device (via the client, etc.) may receive the valid access token. The user device (via the client, etc.) may receive the valid access token based on sending the refresh token to the authentication device and the authentication device determining a positive identity of the resource owner. When the authentication device positively identifies the resource owner as being associated with the user device and/or the client (based on the signal sent by the authentication device), the authentication device may send the valid access token to the user device (via the client, etc.).

At 760, the resource may be accessed. The user device (via the client, etc.) may access the resource. The user device (via the client, etc.) may send the valid access token to the resource entity. The resource entity may determine that the access token is valid. The resource entity, based on determining that valid access token is valid, may allow the user device (via the client, etc.) to access the resource.

Figure 8:
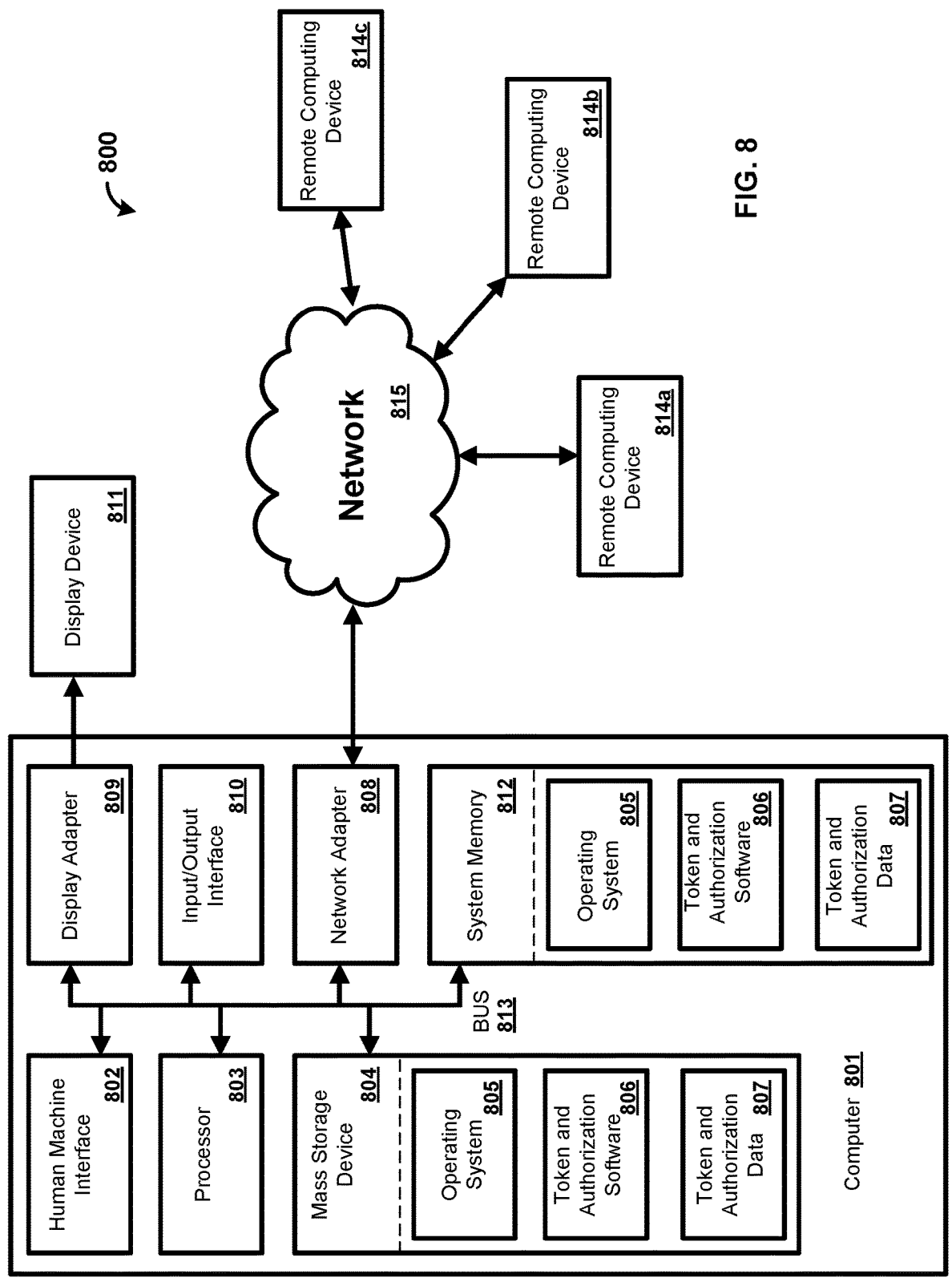
FIG. 8 shows a block diagram of a computing device for implementing accessing a resource.

FIG. 8 shows a system 800 for accessing a resource. Any device/component described herein may be a computer 801 as shown in FIG. 8.

The computer 801 may comprise one or more processors 803, a system memory 812, and a bus 813 that couples various components of the computer 801 including the one or more processors 803 to the system memory 812. In the case of multiple processors 803, the computer 801 may utilize parallel computing.

The bus 813 may comprise one or more of several possible types of bus structures, such as a memory bus, memory controller, a peripheral bus, an accelerated graphics port, and a processor or local bus using any of a variety of bus architectures.

The computer 801 may operate on and/or comprise a variety of computer readable media (e.g., non-transitory). Computer readable media may be any available media that is accessible by the computer 801 and comprises, non-transitory, volatile and/or non-volatile media, removable and non-removable media. The system memory 812 has computer readable media in the form of volatile memory, such as random access memory (RAM), and/or non-volatile memory, such as read only memory (ROM). The system memory 812 may store data such as token and authorization data 807 and/or program modules such as operating system 805 and token and authorization software 806 that are accessible to and/or are operated on by the one or more processors 803.

The computer 801 may also comprise other removable/non-removable, volatile/non-volatile computer storage media. The mass storage device 804 may provide non-volatile storage of computer code, computer readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 804. An operating system 805 and token and authorization software 806 may be stored on the mass storage device 804. One or more of the operating system 805 and token and authorization software 806 (or some combination thereof) may comprise program modules and the token and authorization software 806. Token and authorization data 807 may also be stored on the mass storage device 804. Token and authorization data 807 may be stored in any of one or more databases known in the art. The databases may be centralized or distributed across multiple locations within the network 815.

A user may enter commands and information into the computer 801 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 803 via a human machine interface 802 that is coupled to the bus 813, but may be connected by other interface and bus structures, such as a parallel port, game port, an IEEE 1394 Port (also known as a Firewire port), a serial port, network adapter 808, and/or a universal serial bus (USB).

A display device 811 may also be connected to the bus 813 via an interface, such as a display adapter 809. It is contemplated that the computer 801 may have more than one display adapter 809 and the computer 801 may have more than one display device 811. A display device 811 may be a monitor, an LCD (Liquid Crystal Display), light emitting diode (LED) display, television, smart lens, smart glass, and/or a projector. In addition to the display device 811, other output peripheral devices may comprise components such as speakers (not shown) and a printer (not shown) which may be connected to the computer 801 via Input/Output Interface 810. Any step and/or result of the methods may be output (or caused to be output) in any form to an output device. Such output may be any form of visual representation, including, but not limited to, textual, graphical, animation, audio, tactile, and the like. The display 811 and computer 801 may be part of one device, or separate devices.

The computer 801 may operate in a networked environment using logical connections to one or more remote computing devices 814*a,b,c*. A remote computing device 814*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 801 and a remote computing device 814*a,b,c* may be made via a network 815, such as a local area network (LAN) and/or a general wide area network (WAN). Such network connections may be through a network adapter 808. A network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components may reside at various times in different storage components of the computing device 801, and are executed by the one or more processors 803 of the computer 801. An implementation of token and authorization software 806 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
sending, to a user device, based on a received valid refresh token, an invalid access token;
receiving, via the user device, based on a failed attempt to access a resource with the invalid access token, a valid refresh token; and
sending, to the user device, based on the valid refresh token, a valid access token.

2. The method of claim 1, wherein receiving, based on the failed attempt to access the resource with the invalid access token, the valid refresh token comprises receiving the valid access token from a client application associated with the user device.

3. The method of claim 1, wherein the failed attempt to access the resource is based on an attempt to access the resource with an access token associated with the valid refresh token.

4. The method of claim 1, further comprising:
sending, to a verification entity, a signal that causes the verification entity to determine authentication information associated with the user device; and
determining, based on the authentication information, the valid access token.

5. The method of claim 1, further comprising determining, based on a duration associated with the valid refresh token, that the valid refresh token is valid.

6. The method of claim 1, wherein sending the valid access token is further based on a verification associated with the user device.

7. A method comprising:
sending, to a user device, based on a received valid refresh token, an invalid access token;
sending, to a verification device, a signal that causes the verification device to authenticate the user device associated with a client application;
receiving, via the user device, based on a failed attempt to access a resource with the invalid access token, a valid refresh token; and
sending, to the user device, based on the valid refresh token and based on an indication from the verification device that the user device was authenticated, a valid access token.

8. The method of claim 7, wherein receiving, based on the failed attempt to access the resource with the invalid access token, the valid refresh token comprises receiving the valid access token from the client application associated with the user device.

9. The method of claim 7, wherein the failed attempt to access the resource is based on an attempt to access the resource with an access token associated with the valid refresh token.

10. The method of claim 7, further comprising determining, based on a duration associated with the valid refresh token, that the valid refresh token is valid.

11. The method of claim 7, wherein the valid refresh token is received via the user device based on the failed attempt by the user device to access the resource.

12. A method comprising:
sending, via a user device to an authorization device, a valid refresh token;
receiving, based on the valid refresh token, an invalid access token;
sending, to the authorization device, based on a failed attempt to access a resource with the invalid access token, the valid refresh token;
receiving, based on the valid refresh token, a valid access token; and
accessing, based on the valid access token, the resource.

13. The method of claim 12, further comprising sending, to a resource device, based on receiving the invalid access token, a request to access the resource.

14. The method of claim 12, wherein the failed attempt to access the resource is based on sending, to a resource device, the invalid access token.

15. The method of claim 12, wherein sending the valid refresh token based on the failed attempt to access the resource causes one or more of the authorization device or another device to authenticate one or more of the user device or a client application associated with the user device.

16. An apparatus comprising:
one or more processors; and
memory storing processor-executable instructions that, when executed by the one or more processors, cause the apparatus to:
send, to a user device, based on a received valid refresh token, an invalid access token;
receive, via the user device, based on a failed attempt to access a resource with the invalid access token, a valid refresh token; and
send, to the user device, based on the valid refresh token, a valid access token.

17. The apparatus of claim 16, wherein the processor-executable instructions that, when executed by the one or more processors, cause the apparatus to receive, based on the failed attempt to access the resource with the invalid access token, the valid refresh token, cause the apparatus to receive the valid access token from a client application associated with the user device.

18. The apparatus of claim 16, wherein the failed attempt to access the resource is based on an attempt to access the resource with an access token associated with the valid refresh token.

19. The apparatus of claim 16, wherein the processor-executable instructions, when executed by the one or more processors, further cause the apparatus to:
send, to a verification entity, a signal that causes the verification entity to determine authentication information associated with the user device; and
determine, based on the authentication information, the valid access token.

20. The apparatus of claim 16, wherein the processor-executable instructions, when executed by the one or more processors, further cause the apparatus to determine, based on a duration associated with the valid refresh token, that the valid refresh token is valid.

21. The apparatus of claim 16, wherein the processor-executable instructions that, when executed by the one or more processors, cause the apparatus to send the valid access token, cause the apparatus to send the valid access token further based on a verification associated with the user device.

22. An apparatus comprising:
one or more processors; and
memory storing processor-executable instructions that, when executed by the one or more processors, cause the apparatus to:
send, to a user device, based on a received valid refresh token, an invalid access token;
send, to a verification device, a signal that causes the verification device to authenticate the user device associated with a client application;

receive, via the user device, based on a failed attempt to access a resource with the invalid access token, the valid refresh token; and send, to the user device, based on the valid refresh token and based on an indication from the verification device that the user device was authenticated, a valid access token.

23. The apparatus of claim 22, wherein the processor-executable instructions that, when executed by the one or more processors, cause the apparatus to receive, based on the failed attempt to access the resource with the invalid access token, the valid refresh token, cause the apparatus to receive the valid access token from the client application associated with the user device.

24. The apparatus of claim 22, wherein the failed attempt to access the resource is based on an attempt to access the resource with an access token associated with the valid refresh token.

25. The apparatus of claim 22, wherein the processor-executable instructions, when executed by the one or more processors, further cause the apparatus to determine, based on a duration associated with the valid refresh token, that the valid refresh token is valid.

26. The apparatus of claim 22, wherein the valid refresh token is received via the user device based on the failed attempt by the user device to access the resource.

27. An apparatus comprising:
one or more processors; and
memory storing processor-executable instructions that, when executed by the one or more processors, cause the apparatus to:
send, via a user device to an authorization device, a valid refresh token;
receive, based on the valid refresh token, an invalid access token;
send, to the authorization device, based on a failed attempt to access a resource with the invalid access token, the valid refresh token;
receive, based on the valid refresh token, a valid access token; and
access, based on the valid access token, the resource.

28. The apparatus of claim 27, wherein the processor-executable instructions, when executed by the one or more processors, further cause the apparatus to send, to a resource device, based on receiving the invalid access token, a request to access the resource.

29. The apparatus of claim 27, wherein the failed attempt to access the resource is based on sending, to a resource device, the invalid access token.

30. The apparatus of claim 27, wherein the processor-executable instructions that, when executed by the one or more processors, cause the apparatus to send the valid refresh token based on the failed attempt to access the resource, cause one or more of the authorization device or another device to authenticate one or more of the user device or a client application associated with the user device.

31. One or more non-transitory computer-readable media storing processor-executable instructions that, when executed by at least one processor, cause the at least one processor to:
send, to a user device, based on a received valid refresh token, an invalid access token;
receive, via the user device, based on a failed attempt to access a resource with the invalid access token, the valid refresh token; and
send, to the user device, based on the valid refresh token, a valid access token.

32. The one or more non-transitory computer-readable media of claim 31, wherein the processor-executable instructions that, when executed by the at least one processor, cause the at least one processor to receive, based on the failed attempt to access the resource with the invalid access token, the valid refresh token, cause the at least one processor to receive the valid access token from a client application associated with the user device.

33. The one or more non-transitory computer-readable media of claim 31, wherein the failed attempt to access the resource is based on an attempt to access the resource with an access token associated with the valid refresh token.

34. The one or more non-transitory computer-readable media of claim 31, wherein the processor-executable instructions, when executed by the at least one processor, further cause the at least one processor to:
send, to a verification entity, a signal that causes the verification entity to determine authentication information associated with the user device; and
determine, based on the authentication information, the valid access token.

35. The one or more non-transitory computer-readable media of claim 31, wherein the processor-executable instructions, when executed by the at least one processor, further cause the at least one processor to determine, based on a duration associated with the valid refresh token, that the valid refresh token is valid.

36. The one or more non-transitory computer-readable media of claim 31, wherein the processor-executable instructions that, when executed by the at least one processor, cause the at least one processor to send the valid access token, cause the at least one processor to send the valid access token further based on a verification associated with the user device.

37. One or more non-transitory computer-readable media storing processor-executable instructions that, when executed by at least one processor, cause the at least one processor to:
send, to a user device, based on a received valid refresh token, an invalid access token;
send, to a verification device, a signal that causes the verification device to authenticate the user device associated with a client application;
receive, via the user device, based on a failed attempt to access a resource with the invalid access token, the valid refresh token; and
send, to the user device, based on the valid refresh token and based on an indication from the verification device that the user device was authenticated, a valid access token.

38. The one or more non-transitory computer-readable media of claim 37, wherein the processor-executable instructions that, when executed by the at least one processor, cause the at least one processor to receive, based on the failed attempt to access the resource with the invalid access token, the valid refresh token, cause the at least one processor to receive the valid access token from the client application associated with the user device.

39. The one or more non-transitory computer-readable media of claim 37, wherein the failed attempt to access the resource is based on an attempt to access the resource with an access token associated with the valid refresh token.

40. The one or more non-transitory computer-readable media of claim 37, wherein the processor-executable instructions, when executed by the at least one processor, further cause the at least one processor to determine, based on a duration associated with the valid refresh token, that the valid refresh token is valid.

41. The one or more non-transitory computer-readable media of claim 37, wherein the valid refresh token is received via the user device based on the failed attempt by the user device to access the resource.

42. One or more non-transitory computer-readable media storing processor-executable instructions that, when executed by at least one processor, cause the at least one processor to:
  send, via a user device to an authorization device, a valid refresh token;
  receive, based on the valid refresh token, an invalid access token;
  send, to the authorization device, based on a failed attempt to access a resource with the invalid access token, the valid refresh token;
  receive, based on the valid refresh token, a valid access token; and
  access, based on the valid access token, the resource.

43. The one or more non-transitory computer-readable media of claim 42, wherein the processor-executable instructions, when executed by the at least one processor, further cause the at least one processor to send, to a resource device, based on receiving the invalid access token, a request to access the resource.

44. The one or more non-transitory computer-readable media of claim 42, wherein the failed attempt to access the resource is based on sending, to a resource device, the invalid access token.

45. The one or more non-transitory computer-readable media of claim 42, wherein the processor-executable instructions that, when executed by the at least one processor, cause the at least one processor to send the valid refresh token based on the failed attempt to access the resource, cause one or more of the authorization device or another device to authenticate one or more of the user device or a client application associated with the user device.

46. A system comprising:
  a computing device configured to:
    send, to a user device, based on a received valid refresh token, an invalid access token;
    receive, via the user device, based on a failed attempt to access a resource with the invalid access token, the valid refresh token; and
    send, to the user device, based on the valid refresh token, a valid access token; and
  the user device configured to:
    receive the invalid access token; and
    receive the valid access token.

47. The system of claim 46, wherein the computing device is configured to receive, based on the failed attempt to access the resource with the invalid access token, the valid refresh token, by the computing device being configured to receive the valid access token from a client application associated with the user device.

48. The system of claim 46, wherein the failed attempt by the user device to access the resource is based on an attempt by the user device to access the resource with an access token associated with the valid refresh token.

49. The system of claim 46, wherein the computing device is further configured to:
  send, to a verification entity, a signal that causes the verification entity to determine authentication information associated with the user device; and
  determine, based on the authentication information, the valid access token.

50. The system of claim 46, wherein the computing device is further configured to determine, based on a duration associated with the valid refresh token, that the valid refresh token is valid.

51. The system of claim 46, wherein to send the valid access token, the computing device is further configured to send the valid access token based on a verification associated with the user device.

52. A system comprising:
  a computing device configured to:
    send, to a user device, based on a received valid refresh token, an invalid access token;
    send, to a verification device, a signal that causes the verification device to authenticate the user device associated with a client application;
    receive, via the user device, based on a failed attempt to access a resource with the invalid access token, the valid refresh token; and
    send, to the user device, based on the valid refresh token and based on an indication from the verification device that the user device was authenticated, a valid access token; and
  the user device configured to:
    receive the invalid access token; and
    receive the valid access token.

53. The system of claim 52, wherein the computing device is configured to receive, based on the failed attempt to access the resource with the invalid access token, the valid refresh token, by the computing device being configured to receive the valid access token from the client application associated with the user device.

54. The system of claim 52, wherein the failed attempt by the user device to access the resource is based on an attempt by the user device to access the resource with an access token associated with the valid refresh token.

55. The system of claim 52, wherein the computing device is further configured to determine, based on a duration associated with the valid refresh token, that the valid refresh token is valid.

56. The system of claim 52, wherein the valid refresh token is received via the user device based on the failed attempt by the user device to access the resource.

57. A system comprising:
  a computing device configured to:
    send, via a user device to an authorization device, a valid refresh token;
    receive, based on the valid refresh token, an invalid access token;
    send, to the authorization device, based on a failed attempt to access a resource with the invalid access token, the valid refresh token;
    receive, based on the valid refresh token, a valid access token; and
    access, based on the valid access token, the resource; and
  the authorization device configured to:
    receive the valid refresh token.

58. The system of claim 57, wherein the computing device is further configured to send, to a resource device, based on receiving the invalid access token, a request to access the resource.

59. The system of claim 57, wherein the failed attempt to access the resource is based on sending, to a resource device, the invalid access token.

60. The system of claim 57, wherein the computing device being configured to send the valid refresh token based on the failed attempt to access the resource causes one or more of the authorization device or another device to authenticate one or more of the user device or a client application associated with the user device.

\* \* \* \* \*